United States Patent [19]

Vossen

[11] Patent Number: 5,396,279
[45] Date of Patent: Mar. 7, 1995

[54] METHOD AND APPARATUS FOR SETTING FLAT ELEMENTS IN RELATION TO A REFERENCE DEVICE, IN PARTICULAR STAMPING DIES OR THE LIKE

[75] Inventor: Manfred Vossen, Niederkrüchten, Germany

[73] Assignee: Meurer Nonfood Product GmbH, Radolfzell, Germany

[21] Appl. No.: 985,791

[22] Filed: Dec. 3, 1992

[30] Foreign Application Priority Data

Dec. 6, 1991 [DE] Germany .................. 41 40 211.1

[51] Int. Cl.⁶ ............................................. H04N 7/18
[52] U.S. Cl. ......................................... 348/95; 348/88
[58] Field of Search ............... 358/93, 101, 107; 382/8; H04N 7/18; 348/87, 88, 94, 95

[56] References Cited

U.S. PATENT DOCUMENTS 4,953,016  8/1990  Boujon ..................... 358/101
5,212,647  5/1993  Raney ...................... 358/107

*Primary Examiner*—Howard W. Britton
*Attorney, Agent, or Firm*—Bachman & LaPointe

[57] ABSTRACT

In a method of setting flat elements in relation to a reference device, in particular stamping dies or the like, and for aligning embossing blocks relative to an embossing original outside a stamping machine by means of a camera and picture screen associated therewith, the camera position is set over a holding frame and a marking at one side of the holding frame and displaced until the image of the camera on the picture screen is coincident with a line of a reticle, whereafter the camera is moved over a second marking, which is approximately aligned with the first marking, at the other end of the holding frame and then the rear part of the holding frame is displaced at a right angle to the first direction of travel until the image of the second marking on the picture screen is coincident with that reticle line. In addition the stamping die is to be enclosed and parallelism is to be set relative to the first direction of travel by way of the reticle line; after setting of the stamping die, the embossing original is arranged over same, using a carrier plate provided with markings.

17 Claims, 6 Drawing Sheets

METHOD AND APPARATUS FOR SETTING FLAT ELEMENTS IN RELATION TO A REFERENCE DEVICE, IN PARTICULAR STAMPING DIES OR THE LIKE

BACKGROUND OF THE INVENTION

The invention relates to a method of setting flat elements in relation to a reference device, in particular stamping dies or the like, and for aligning embossing printing blocks relative to an embossing original outside a stamping machine, by means of a camera and picture screen associated therewith. In addition the invention concerns a corresponding apparatus which can also be used for carrying out the method.

German laid-open application (DE-OS) No 39 17 919 discloses a table for positioning elements on a carrier in accordance with reference documents, comprising a plate on which the reference document lies and over which a first video camera carried by a carriage is displaceable in a parallel plane. The carriage is movable along a traverse member which in turn is movable laterally along the plate with the carriage. A second camera which is carried by an arm which is movable along a bridge can be displaced over a working plane in a parallel plane, wherein the arm and the bridge can each be moved by a respective electromechanical drive device. Control of the electromechanical drive devices for moving the bridge and the arm of the second camera is effected so that the latter is displaced relative to the movements of the first camera, which movements are controlled by a manipulator and are detected by first position detectors mounted on the carriage, the traverse member and the plate, the electronic control device monitoring the degree of accuracy of the movements of the second camera in order to permit same to perform complementary movements.

The previously known apparatus is technically complex as two separate systems are required and in addition it involves considerable costs.

The embossing original required is heated and distorts, which results in inaccuracies. Added to that are deviations as between the two systems due to inevitable geometry flaws in the two guide systems.

Cardboard or pasteboard boxes are stamped out with so-called steel strip cutting tools. Steel strip cutting tools are stamping or punching dies in which strip-shaped blades and fold lines, following the contours of the cardboard or pasteboard boxes, are arranged in slits in a plate (preferably a multi-layer plywood plate). For use in automatic stamping or punching machines, the steel strip cutting tools are clamped in holding frame structures.

Many higher-grade cardboard or pasteboard boxes are provided with embossings, on account of the pleasant appearance. Embossings may be on the one hand hot foil embossings in which colored, shiny and/or metallized foils are embossed on to the blanks under the effect of heat, while on the other hand it is also possible to refer to embossing when the material is deformed in a relief pattern by embossing blocks. Relief embossing can also be effected by using hot foils or on the sheet with or without printing thereon.

Whichever method is employed, because of the high requirement in terms of quality concerning positional accuracy of the embossing blocks relative to the sheet of material, it is necessary to reckon on extremely long setting times at the stamping machines.

SUMMARY OF THE INVENTION

In consideration of those aspects, the inventor set himself the aim of improving a method of the kind set forth in the opening part of this specification, and a corresponding apparatus, while avoiding the known disadvantages.

That object is attained by the teaching of the present invention.

In accordance with the invention, the camera position is to be set over a holding frame and a marking at one side of the holding frame and displaced until the image of the camera on the picture screen is coincident with a line of a reticle. Then the camera is moved over a second marking a approximately aligned with the first marking at the other end of the holding frame and then the rear part of the holding frame is displaced at a right angle to the first direction of travel until the image of the second marking on the picture screen is coincident with that reticle line.

In accordance with the method the stamping die is enclosed and, when that happens, parallelism is set relative to the first direction of travel by way of the reticle line.

After setting of the stamping die, in accordance with a further feature of the invention, the embossing original is arranged over the stamping die, using a carrier plate which is provided with markings, and the embossing original is set in a first blade position and relative to the middle of the sheet, then immovably fixed relative to the carrier plate.

Now, in accordance with the invention, the embossing locations are continuously numbered on the embossing original which has been prepared for status detection or acquisition.

It is in accordance with the invention to change on the picture screen, prior to the embossing operation, from the black-and-white mode which has been set hitherto, to a color mode.

The camera is now moved over a marking and the reticle of the picture screen is brought into coincidence therewith in order in that way to fix and retain the original position; in the further course of the method, the camera is to be moved at the original position to the first embossing location and same is to be shown on the picture screen and stored.

After storage of the embossing locations, the carrier plate can be removed, with the embossing original. Now, by calling up an embossing location, it is possible to set the embossing block, in which respect, by positional variation, the image thereof on the picture screen is brought into coincidence with the image of the embossing location; the embossing block is thus fixed on the embossing die in an accurate position.

An aspect of particular significance is the computer-aided use of the method for the production of elements for hot embossing, which, as is known, involves an increase in length or a rise in temperature. The predetermined variation in length of the embossing die or the embossing block under the influence of heat is indicated by means of simulation of the thermal expansion on the picture screen as a varying position, and the embossing blocks are set controlledly closer in the cold condition; the corresponding length-reduction measurements can be readily ascertained by the computer and introduced.

In accordance with the object of the invention there is an apparatus having a traverse member which is movable over a table plate or like plane, as a means providing a path of movement for a camera movable along same with associated picture screen and a longitudinal and a transverse measuring system, which together determine the position of the cameras movable over them in two co-ordinates and are storably connected in the computer of the apparatus.

For fixing and supporting the embossing (stamping) die, displaceable bar portions are associated with a stationary support plate of the table plate.

In accordance with the invention the camera is provided interchangeably in a holder of the traverse member and is also adapted to be rotatable about its axis and/or inclinable relative thereto, wherein the corresponding positions can be accurately set, measured and stored. A printing means makes it possible in accordance with the invention for each setting to be durably documented.

With the apparatus according to the invention, in the production of cardboard or pasteboard boxes or the like, on the one hand the level of quality is positively affected while on the other hand, in regard to certain groups of products, a significant reduction in the setting-up times on the automatic stamping machines is achieved.

Because of the wood construction, steel strip cutting tools may suffer for example due to climatic influences, they may become larger or smaller and they may distort. With the measuring apparatus according to the invention, such variations are detected in the initial or starting phase, and it is possible to avoid wastage.

When the stamping dies are enclosed in the holding frames, errors may occur, for example overstressing, that is to say compressing, or deformation out of a right angle, which, in the operation of enclosing the steel strip cutting tools, can be immediately detected and corrected on the measuring apparatus by continuous monitoring.

On the setting machine according to the invention, it is also possible to position the embossing blocks relative to the sheet position with sufficient accuracy, for all embossing procedures.

In contrast to the state of the art, in accordance with the invention, only one system is required, with a camera, a guide arrangement and a x-y-travel detection system. The apparatus is inexpensive for that reason. In addition the embossing original is only required for detection for a short time, when it is exposed, and that reduces the likelihood of distortion. In addition to the higher level of accuracy which is consequently achieved, in comparison with the state of the art, there is also the consideration that flaws in geometry in the guide arrangement do not play any part as they occur both in the detection phase and also in the reproduction phase.

BRIEF DESCRIPTION OF THE DRAWINGS

Further advantages, features and details of the invention will be apparent from the following description of preferred embodiments and with reference to the drawings in which.

DETAILED DESCRIPTION OF PREFERRED EMBODIMENTS

Figure 1:
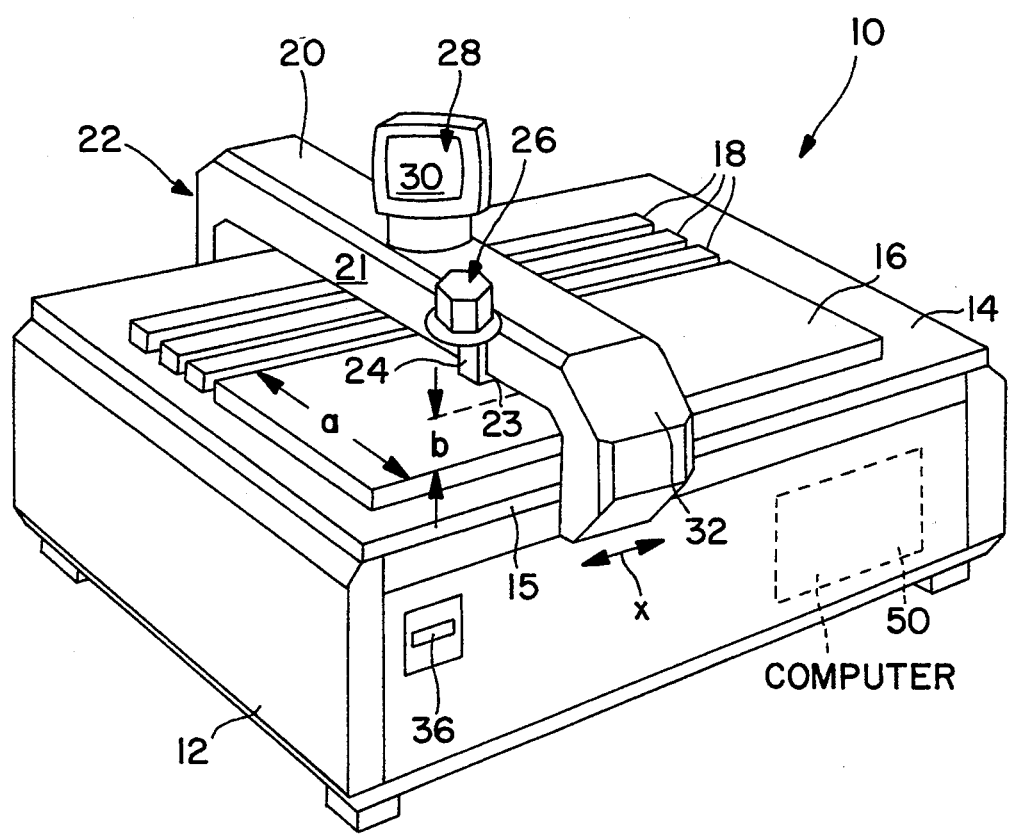
FIG. 1 is a perspective view of an apparatus with camera.

An apparatus 10 illustrated in FIG. 1 has a table-like main frame structure 12 with a stable table plate 14 laid thereon, of cast material, which is provided with a stationary support plate 16 of a width a and three bar portions 18 which are parallel thereto; the latter are displaceable and serve for supporting embossing (stamping) dies which are to be built up.

A traverse member 20, which is stiff in respect of torsion, of a bridge-like yoke 22 extends at a spacing b relative to the support plate 16 in a plane parallel to the table plate 14. The yoke 22 can be moved along the longitudinal edge 15 of the table in the direction indicated by the arrow x, being guided completely parallel and straight by means of rigid elements.

A camera holder 24 runs at a right angle to the above-mentioned longitudinal edge 15 of the table on a guide 23 which is also straight and rigid on a side portion 21 of the traverse member 20. The camera holder 24 selectively carries a video camera 26 with spotlight 27 (see FIGS. 2 and 3) and different lenses, or a camera with variable lenses. A monitor 28 can also be seen on the traverse member 20, which monitor 28 can be operated alternately in black-and-white or with a colored image on its picture screen 30.

Disposed at the front side of the yoke 22, which is towards the operator, is an operating panel 32 on which machine control is effected by way of picture screen menus, using a dialogue procedure. A hard copy of the current picture screen content can also be printed and outputted at any time by way of a thermal printer which is only diagrammatically indicated at 36, for example after pressing a 'print button'.

Figure 2:
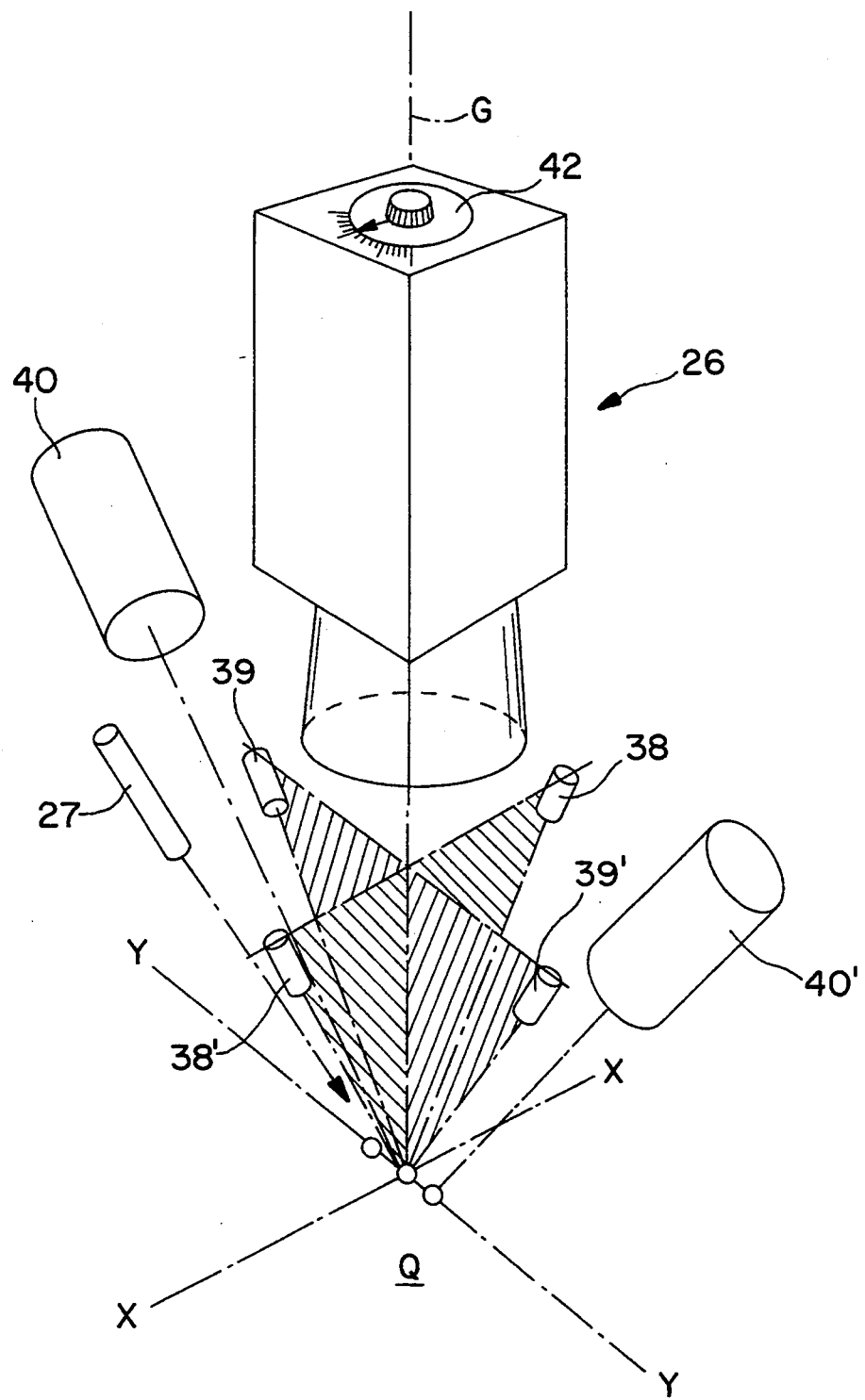
FIG. 2 is a diagrammatic perspective view of the camera with lighting units.

As shown in FIG. 2, the camera 26 is provided with lamps above an object plane Q for the various functions, and the spotlight 27 facilitates coarse position finding. Two pairs of lamps 38 and 39, 38' and 39' selectively provide inclined light for stamping blades, which are still to be described hereinafter, in the y- and x-direction respectively. Two further lamps 40, 40' serve for illumination in the case of embossing devices.

For measuring out or surveying inclinedly extending blades or the like, the camera 26 can be turned through ±45° about its vertical axis G, and the precise angle can be read off in each case on an angle vernier 42.

Figure 3:
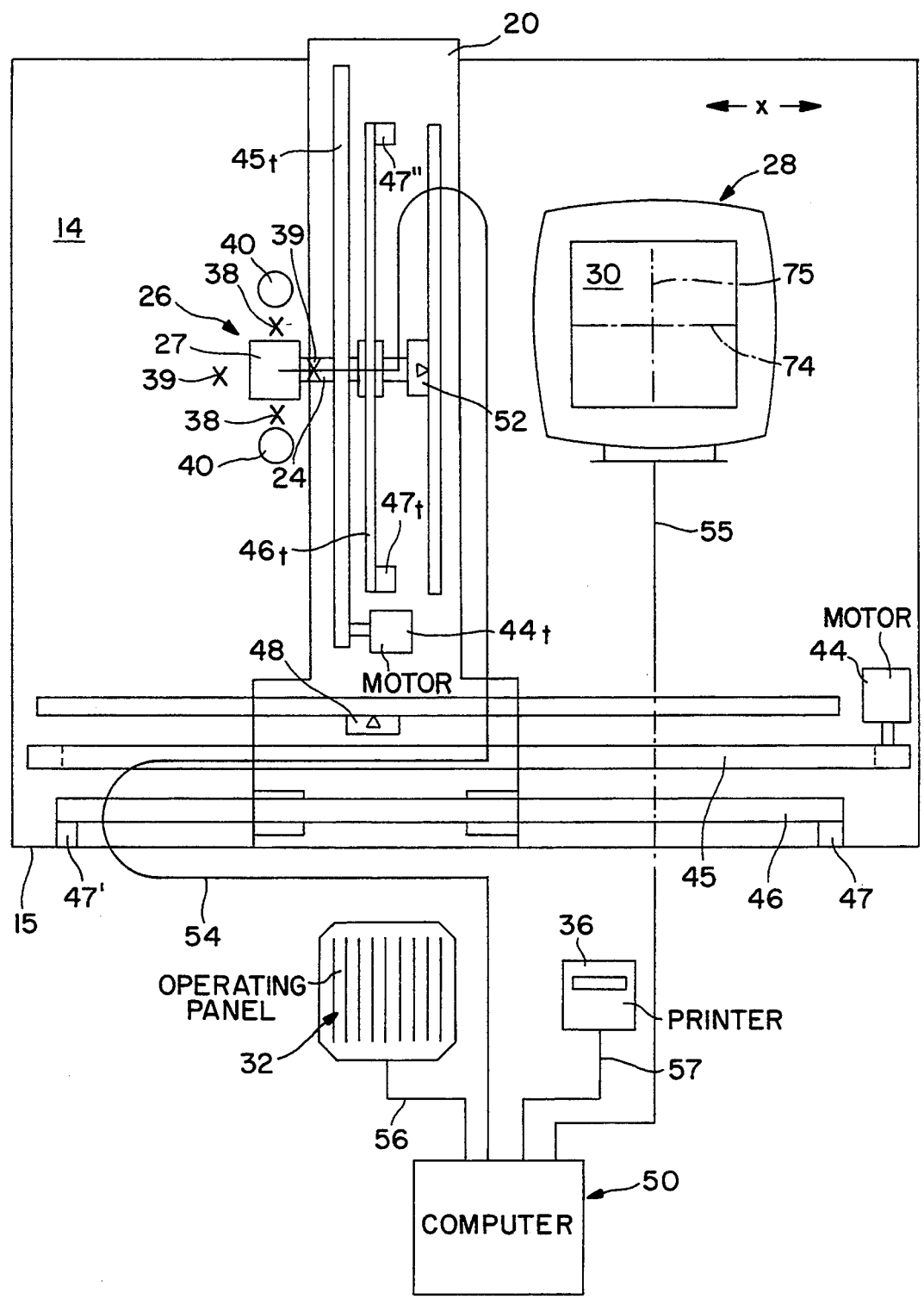
FIG. 3 is a sketch view showing the structure of the apparatus in plan, with a front view of the monitor associated therewith, not to scale.

Displacement of the yoke 22 transversely relative to the table plate 14 is effected as in particular FIG. 3 shows by stepping motors 44 by way of toothed belt drives 45, with which longitudinal guides 46 having limit switches 47, 47' are associated. Stepping motors $44_t$, toothed belt drives $45_t$ and longitudinal guides $46_t$ with limit switches $47_t$ and 47'' correspondingly assist in displacement of the camera holder 24 along the traverse member 20.

In both directions, the instantaneous camera position is determined by length measuring systems, and communicated to a computer 50 disposed in the table housing or main frame structure 12.

Disposed on the table plate 14 parallel to the longitudinal guide 46 is a length measuring system 48, while disposed on the traverse member 20 parallel to the longitudinal guide $46_t$ thereof is a transverse measuring system 52.

The connecting line from the camera 26 by way of the length and transverse measuring systems 48 and 52 respectively to the camera 50 is identified in FIG. 3 by reference numeral 54, the connecting line between the computer and the monitor 28 is identified by reference numeral 55, while finally the line from the computer 50 to the operating panel 32 is identified by 56 and to the printer 36 by 57.

Figure 4:
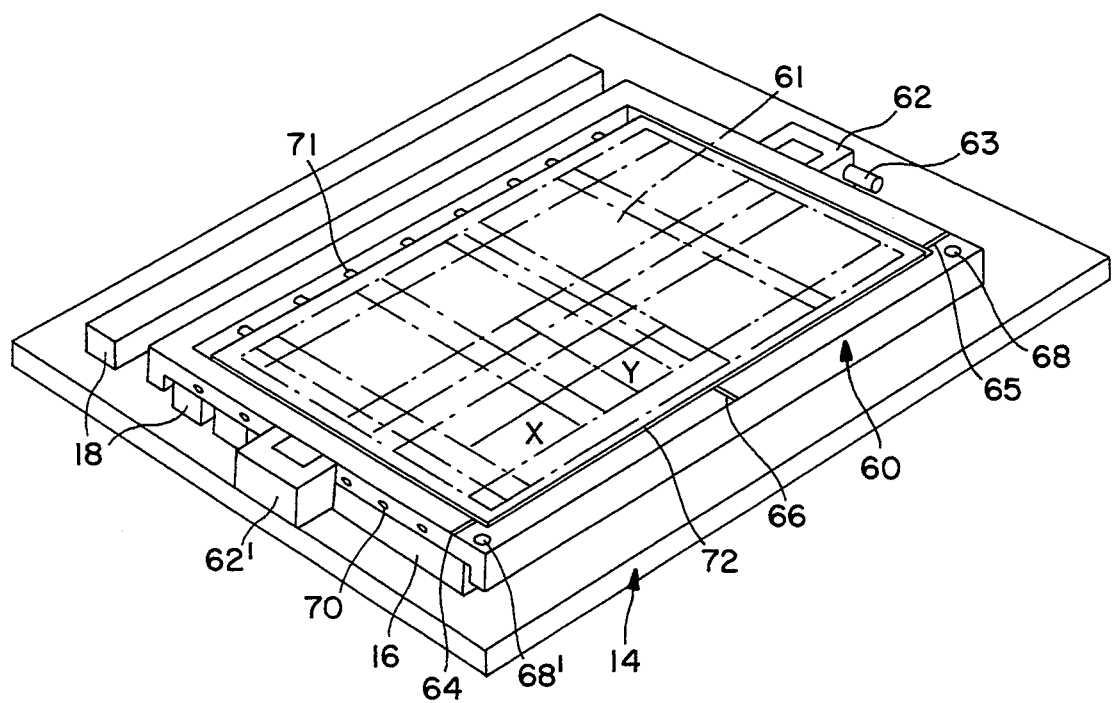
FIG. 4 is a perspective view of a holding frame with stamping die on a measuring and working table.

FIG. 4 shows a holding frame 60 which accommodates a stamping die 61 and, supported from beneath by the support plate 16 and depending on the format size by the bar portions 18, lies with its back or underside upwardly on the table plate 14. The holding frame 60 is exactly held in position by fitting and clamping members 62, 62' a fine adjusting means 63 additionally being provided in that respect. The fit ting and clamping members 62' are of an individual design configuration for any type of automatic stamping machine.

Disposed on the various holding frames 60 are marking lines 64, 65 for the position of a first blade and other marking lines 66 for the middle of the holding frame 60. In addition, for embossing operations, the holding frames 60 are also provided with two index bores 68' for receiving co-operating elements, while pressure screws are identified by 70, 71 in the holding frame.

At the beginning of the procedures involved, the control of the apparatus 10 is switched to 'measuring'. The monitor 28 goes into the black-and-white mode and a reticle with the co-ordinates 74 and 75 appears on the picture screen 30. By means of pushbutton control, from the operating panel 32, the camera 26 is set over the marking 64 for the first blade and moved until the image thereof is coincident on the monitor 28 with the horizontal reticle line 74.

The camera 26 is now moved on the x-axis over the further marking 65 for the first blade. By actuation of the fine adjustment 63, the rear part of the holding frame 60 is displaced on the y-axis until the image of the further marking 65 on the monitor 28 is coincident with the horizontal reticle line 74. That provides for exact parallel positioning of the first markings 64, 65 relative to the longitudinal edge of the machine (x-axis).

It is now possible to provide for enclosure of the stamping die 61. The latter is possibly put into position by spacer members 72 at the first blade side (gripper edge side) and by the pressure screws 70, 71. In that situation, the parallelism relative to the x-axis is in turn adjusted by way of the horizontal reticle line 74 while the angular position of the stamping blades (y-axis) can be checked and corrected by virtue of the vertical reticle line 75.

It is now possible to carry out measurement operations on the stamping die 61; for example all blade spacings can be ascertained for a so-called useful portion or blank portion, or the spacings between two useful portions can be ascertained, or the maximum spacings from the first to the last blade can be ascertained, and so forth.

For that purpose, the measuring devices for both axes x, y are set to zero in each position and the next movements are displayed on the monitor 28 as absolute measurements or dimensions, positive or negative. Entire series of measurements can be made up by means of a suitable program and displayed in individual masks on the picture screen 30.

Figure 5:
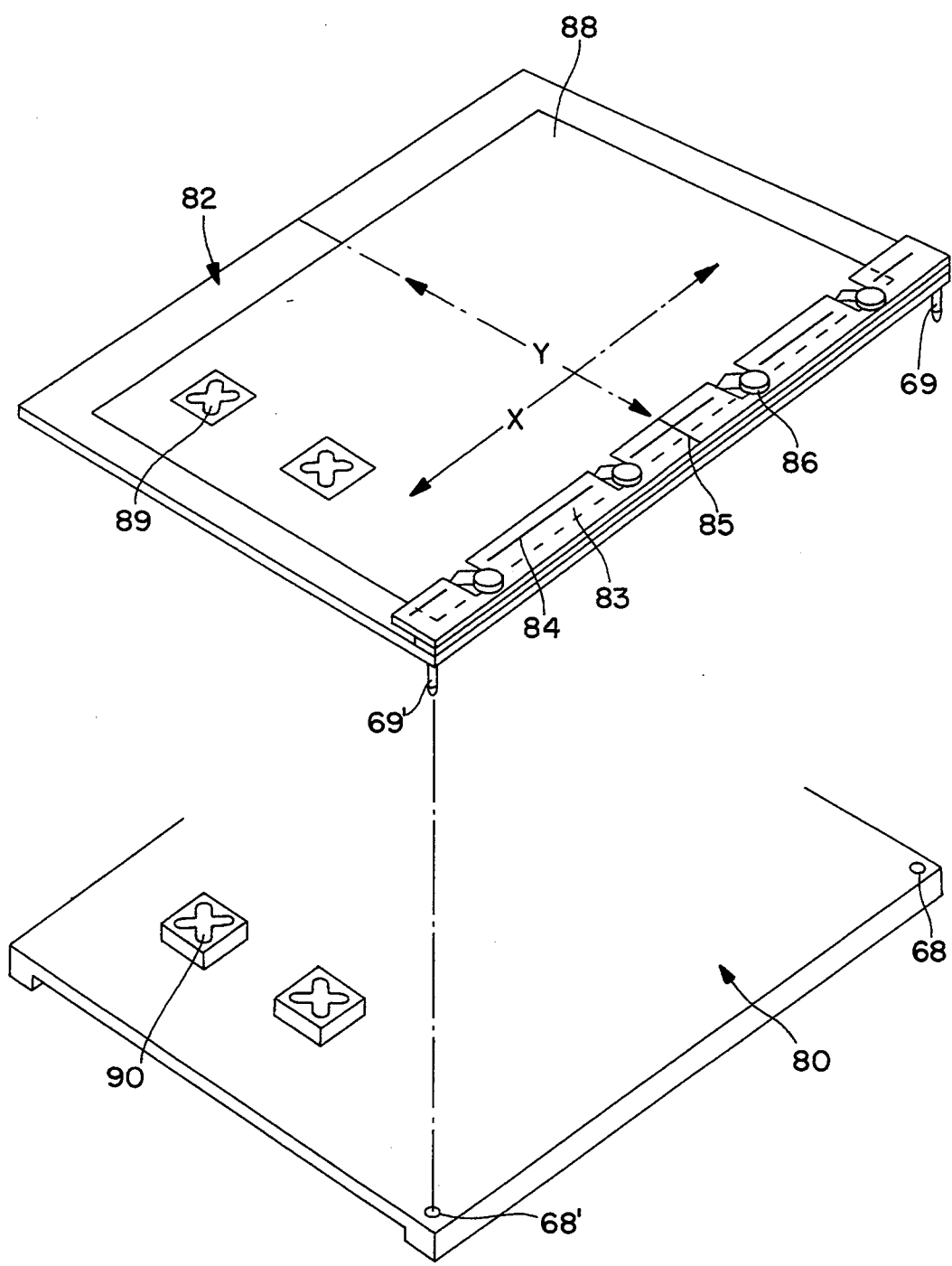
FIG. 5 is a perspective view of a carrier plate with embossing original and associated embossing die with embossing blocks.

Operation for a setting machine for setting embossing blocks will now be described with reference to FIG. 5. For the purposes of cold embossing, an embossing die 80, or in the case of combined stamping and embossing operations the holding frame 60 is locked in the above-described manner on the table plate 14 and oriented parallel to the x-axis. In the case of combined operations, this procedure possibly also involves the step of enclosing an embossing/stamping die which is also identified by reference numeral 80. In that respect, attention is to be paid to the precise position of the first blade and conformity between the marking 66 'holding frame center' and the 'embossing/stamping die center'. The procedure now involves arranging the embossing original in position above the embossing/stamping die 80. For that purpose, use is made of a special carrier plate 82 which is accurately oriented relative to the embossing/stamping die 80 by way of index pins 69, 69' under a transparent bar or strip 82, and which is provided with markings 84 and 85 for the first blade position and for the plate center respectively. The carrier plate 82 also includes clamping devices 86 for the sheet edge.

Generally the embossing original 88, a printed sheet or a transparent lay-out drawing, also has to be provided with the markings for the sheet center and/or the position of the first blade, that being effected by measuring out and drawing in by hand.

The carrier plate 82 is fixed on the embossing/stamping die 60, 80 by means of the index pins, 69'. Thereafter the embossing original 88 is precisely adjusted in the first blade position and relative to the sheet center ($\pm 1$ mm degree of accuracy is sufficient) and immovably fixed to the carrier plate 82 at the gripper edge side by means of the sheet clamping devices 86. Under some circumstances it is also necessary for the edges of the sheet to be fixed on the carrier plate 82, by means of adhesive strip or the like. When dealing with corrugated embossing original, additional fixing can be achieved by means of adhesive strips, within and in empty regions by way of small openings.

The embossing original 88 is now ready for the 'status detection' step. Each embossing location 89 which corresponds to an individual embossing block is to be provided with a serial number. The control of the apparatus 10 is switched to 'embossing'.

The monitor 28 now goes into the color mode and the picture screen 30 presents a program menu. After selection of the menu point 'embossing' a reticle 74, 75 again appears. Now, by means of pushbutton control, from the operating panel 32, the camera 26 is moved by motor over the marking cross 84, 85, 'center sheet-position first blade' and displaced until the image thereof on the picture screen 30 is coincident with the reticle 74, 75. By pressing a key that camera position is now internally stored by the computer 50 as the origin of the co-ordinate measurement system; x=o, y=o is now displayed on the monitor 28.

For status detection, by means of pushbutton control, the video camera 22 is moved by motor approximately over the middle of the embossing location bearing the number '1', the spotlight 27 which travels therewith helping in that respect in the positioning operation. The image of the embossing location '1' appears on the picture screen 30, and likewise the co-ordinates x and y of the instantaneous camera position are faded in.

By key(s), the number of the embossing location (here the '1') is inputted and acknowledged. Now, beside the image of the embossing location 1 of the embossing original, the picture screen 30 now shows the following display:

Embossing location '1'
X=xxxx,xxx
Y=xxxx,xxx.

By pressing a key or button, the embossing location image and the associated x,y-co-ordinates are stored under the embossing location numbers by the computer 50. Further details are set forth hereinafter.

The procedure is the same with all further embossing locations. When all embossing locations have been detected or acquired in terms of image and data, the carrier plate 82 with the embossing original 88 can be removed from the embossing/stamping die 60, 80 and it is now possible to begin with the operation of setting the embossing blocks 90.

After the embossing location No '1' has been called up, the picture screen 30 shows the stored image of the embossing location No '1' of the embossing original 88 and the camera 26 automatically assumes the position which it held previously when detecting the embossing location No '1'. After the embossing block 90 bearing the No '1' has been inserted under the camera 26, the image thereof also appears on the monitor 28, so-to-speak overlying the image of the embossing original 88.

By displacement of the embossing block 90, the two images on the picture screen 30 are brought into a condition of coincidence and the embossing block 90 is disposed precisely at the position required for embossing of the embossing original 88; it can now be definitively fixed on the embossing/stamping die 60, 80.

The procedure is the same with all further embossing blocks. At the end, a check and possibly a correction operation can be carried out by going over all positions.

For the purposes of hot embossing or hot foil embossing, the embossing dies or embossing blocks 90 are heated in the automatic stamping machine to temperatures of up to 120° C. In that situation, increases in length and width occur. For the purposes of setting the embossing blocks 90, the machine has program means for simulation of the thermal expansion phenomena, the desired temperature can be set at the operating panel 32 and the amounts of shrinkage are computed.

The program of the computer 50 includes factors which make it possible when setting the embossing block 90 to assume positions which differ from the embossing original 88, that is to say the embossing blocks 90 are in substance set more closely in order to move into the correct positions after heating to the operating temperature.

After the machine is switched on, the main menu 'working program' appears on the picture screen and, by way of certain passwords, the operating system or the menu 'setting program', which is intended for service purposes by authorized personnel, is reached. By selective pressure on keys or buttons (for example 'S' or 'F'), the monitor 28 moves either into the 'black-and-white' mode or into the color mode. The picture screen 30 shows a reticle 74, 75 and beside same a predetermined mask, and it is possible to begin with the die measuring operation.

For the purposes of setting the embossing block, beside the reticle appears the request '1st blade—go to die center'. The execution of that command must be confirmed. The camera position produced applies from 'origin' or reference setting and is internally managed in the computer 50 with x=0 and y=0.

Figure 6:
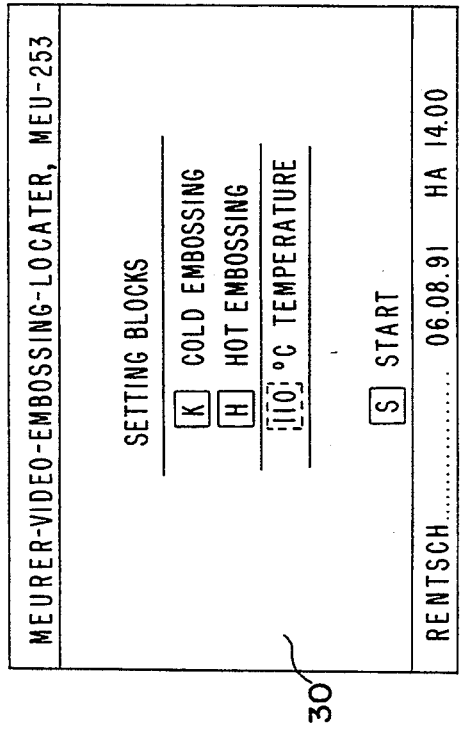
FIGS. 6 through 9 show sketches relating to picture screen displays during a working operation.

There then follows the request to go to the first embossing position, in which case for example an image as shown in FIG. 6 becomes visible.

By pressing a button or key, the camera 26 is moved over the first embossing position so that, as shown in FIG. 6, an emblem 92 or the like appears approximately centrally over the reticle 74, 75 on the picture screen 30.

As already indicated hereinbefore, the following are displayed:
Position 1
X=XXXX,XX
Y=XXXX,XX in which 1 flashes. That position number 94 can be altered. By pressing 'A' the image and the co-ordinates are stored under position No. 1, the image disappears, and the request 'detect 2nd embossing position' is displayed. All embossing positions are stored in that way.

Figure 7:
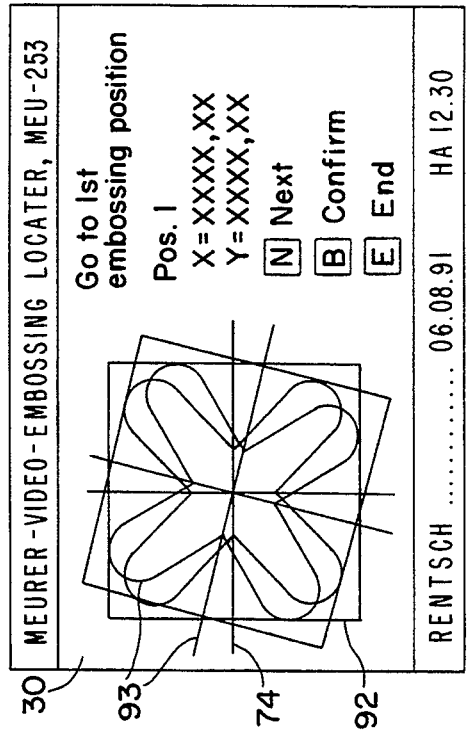

After all embossing positions have been detected or acquired, the detection procedure is terminated by pressing a button or key. The embossing original can be removed from the embossing die, and the the operation of setting the embossing block begins. In that situation the picture screen 30 shows for example the image illustrated in FIG. 7.

Figure 8:
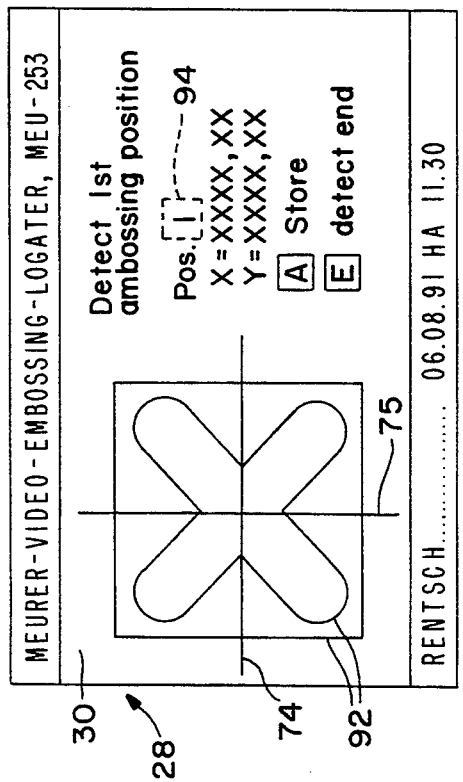

After the operation of pressing 'K' and 'S', the monitor 28 goes to a further menu; if 'H' is pressed, the temperature must also be stated; the system then goes into the further menu as shown in FIG. 8, by way of 'S'.

The image shown in FIG. 8 differs from that shown in FIG. 6 by the item at top right:

'Go to' 1st embossing position and the lower display portion:

| instead of | N | Next |
|---|---|---|
| | B | Confirm |
| | E | End |
| | A | Store |
| | E | Detect end. |

In that situation the image of the embossing original, which is stored at position 1, appears, and the upper position number 95 flashes.

The position number can be altered; in that case the new coordinates can be read off the picture screen 30 and the associated image can also be seen.

After actuation of the key or button B, the camera 26 automatically moves to the co-ordinates of position 1. The corresponding block is now laid under the camera 26 and the image 93 thereof appears on the picture screen 30, superimposed on the image 92 of the embossing original.

Figure 9:
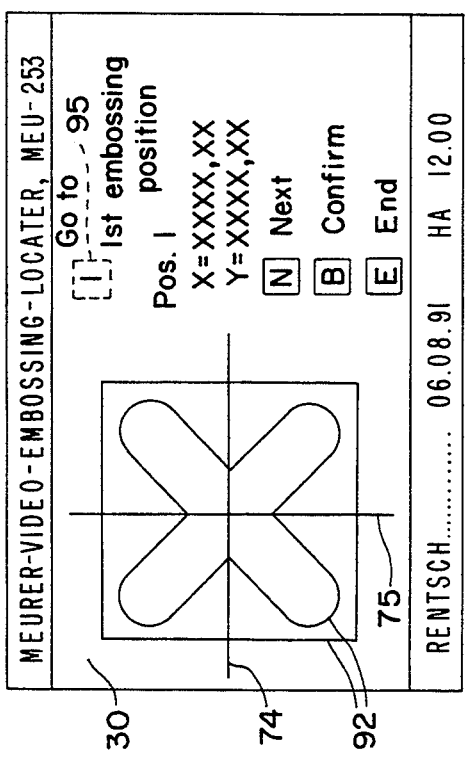

By displacement of the block, the two images 92 and 93 are brought into coincidence and then the block can be definitively mounted in position. That is indicated in FIG. 9.

After pressing 'N', the following appears:
Go to 2nd embossing position
POS. 2
X=XXX,XX
Y=XXX, XX and the image of the embossing original, which is stored at position 2. The camera 26 automatically goes to the co-ordinates of position 2. The second block can now be set, and then the following block is set until all blocks are set.

The detection or acquisition procedure is then terminated by pressing 'E', whereafter the camera 26 automatically moves back into its home position.

I claim:

1. A method of setting flat elements in relation to a reference device, in particular stamping dies or the like, and for aligning embossing blocks relative to an embossing original outside a stamping machine by means of a camera and picture screen associated therewith, which comprises setting a camera position over a holding frame and a first marking at one side of the holding frame, displacing the camera position until the image of the camera on the picture screen is coincident with a line of a reticle, whereafter moving the camera over a second marking which is approximately aligned with the first marking at the other end of the holding frame, and then displacing the rear part of the holding frame at a right angle (y) to the first direction of travel (x) until the image of the second marking on the picture screen is coincident with the reticle line.

2. A method according to claim 1 including the step of enclosing a stamping die and in that operation parallelism is set relative to the first direction of travel (x) by way of the reticle line.

3. A method according to claim 2 including the step of arranging an embossing original over the stamping die using a carrier plate which is provided with markings.

4. A method according to claim 3 wherein the embossing original is set in a first blade position and relative to the sheet center and then immovably fixed relative to the carrier plate.

5. A method according to claim 4 wherein the embossing locations are continuously numbered on the embossing original which has been prepared for status detection.

6. A method according to claim 5 wherein prior to an embossing operation, the picture screen is changed from a black-and-white mode into a color mode.

7. A method according to claim 6 wherein the camera is moved over a marking and the reticle of the picture screen is brought into coincidence therewith and thereby the original position is fixed.

8. A method according to claim 7 wherein the camera is moved from the original position to the first embossing location and the first embossing location is shown on the picture screen and stored.

9. A method according to claim 8 wherein after storage of the embossing location, the carrier plate is removed with the embossing original.

10. A method according to claim 9 wherein by calling up an embossing location setting of the embossing block is effected, wherein by positional variation the image thereof on the picture screen is brought into coincidence with the image of the embossing location and the embossing block is fixed on the embossing die.

11. A method according to claim 10 wherein predetermined variations in length of at least one of the embossing die and the embossing block are displayed due to the influence of heat as a varying position by means of simulation of the thermal expansion on the picture screen.

12. Apparatus for setting flat elements in relation to a reference device, in particular stamping dies or the like, and for aligning embossing blocks relative to an embossing original outside a stamping machine, which comprises a camera with an associated picture screen, a traverse member, a table plate means over which the traverse member is movable as a means providing a path of movement for said camera, wherein said camera is movable along said traverse member with associated picture screen, including a longitudinal and traverse measuring system in two coordinates (x, y) which determine the position of the camera movable over them and are connected storably in a computer, wherein the camera is interchangeably fixed in a holder of the traverse member, and including an output means for printing out the content of the picture screen.

13. Apparatus according to claim 12 wherein displaceable bar portions are associated with a stationary support plate of the table plate means for supporting an embossing die.

14. Apparatus according to claim 12 wherein associated with the camera is at least one lighting device.

15. Apparatus according to claim 14 wherein the camera is suspended rotatably about its vertically extending axis and inclinably relative to said axis at an angle.

16. Apparatus according to claim 15 including a carrier plate which is associated with the embossing die and which can be fixed with retaining elements in cooperating retaining means of the embossing die and which is provided with markings for a first blade position and the plate center.

17. Apparatus according to claim 16 wherein the carrier plate includes clamping means for the edge of the embossing original.

* * * * *